(12) United States Patent
Liberti, Jr. et al.

(10) Patent No.: US 7,688,777 B2
(45) Date of Patent: Mar. 30, 2010

(54) COMBINED ADAPTIVE SPATIO-TEMPORAL PROCESSING AND MULTI-USER DETECTION FOR CDMA WIRELESS SYSTEMS

(76) Inventors: Joseph Charles Liberti, Jr., 11 Spruce Hollow Dr., Howell, NJ (US) 07731; Shimon Moshavi, 550 G Grand St., Apt. G-4F, New York, NY (US) 10002; Paul Gerald Zablocky, 4 Buttonwood Dr., Shrewsbury, NJ (US) 07702

(*) Notice: Subject to any disclaimer, the term of this patent is extended or adjusted under 35 U.S.C. 154(b) by 1180 days.

(21) Appl. No.: 10/971,233

(22) Filed: Jan. 31, 2005

(65) Prior Publication Data
US 2005/0128985 A1 Jun. 16, 2005

Related U.S. Application Data

(62) Division of application No. 09/813,491, filed on Mar. 21, 2001, now abandoned.

(60) Provisional application No. 60/190,803, filed on Mar. 21, 2000.

(51) Int. Cl.
 *H04Q 7/00* (2006.01)
(52) U.S. Cl. ................................................ 370/328
(58) Field of Classification Search ......... 370/203–210, 370/310, 328, 342, 335; 375/130, 147, 148, 375/150–153
See application file for complete search history.

(56) References Cited

U.S. PATENT DOCUMENTS

| | | | |
|---|---|---|---|
| 5,170,411 A | | 12/1992 | Ishigaki |
| 5,268,927 A | * | 12/1993 | Dimos et al. ............... 375/147 |
| 5,596,600 A | | 1/1997 | Dimos et al. ............... 375/206 |
| 5,598,428 A | * | 1/1997 | Sato ........................... 375/148 |
| 5,719,899 A | * | 2/1998 | Thielecke et al. ........... 375/144 |
| 5,757,845 A | * | 5/1998 | Fukawa et al. .............. 375/152 |
| 5,818,882 A | | 10/1998 | Komatsu ..................... 375/344 |
| 5,859,870 A | * | 1/1999 | Tsujimoto ................... 375/143 |

(Continued)

OTHER PUBLICATIONS

Moshavi, Combined space time adaptive processing, 2000 IEEE Sixth international symposium, V 2, Sept. 6-8, 2000, pp. 449-454.*

(Continued)

*Primary Examiner*—Dmitry Levitan
(74) *Attorney, Agent, or Firm*—Fitch, Even, Tabin & Flannery

(57) ABSTRACT

Methods and systems in a wireless receiver for enabling the reception of input signals at varied power levels in the presence of co-channel interference utilizing combinations of space-time adaptive processing (STAP), interference cancellation multi-user detection (MUD), and combined STAP/MUD techniques. In MUD, code, timing, and possibly channel information of multiple users are jointly used to better detect each individual user. The novel combination of adaptive signal reconstruction techniques with interference cancellation MUD techniques provides accurate temporal cancellation of interference with minimal interference residuals. Additional methods and systems extend adaptive signal reconstruction techniques to take Doppler spread into account. STAP techniques permit a wireless receiver to exploit multiple antenna elements to form beams in the direction of the desired signal and nulls in the direction of the interfering signals. The combined STAP-MUD methods and systems increase the probability of successful user detection by taking advantage of the benefits of each reception method. An additional method and system utilizes STAP techniques in the case where no pilot signal is available. This method compares the outputs of various hypothesized STAP solutions.

12 Claims, 15 Drawing Sheets

U.S. PATENT DOCUMENTS

| | | | |
|---|---|---|---|
| 5,872,540 A | 2/1999 | Casabona et al. | |
| 6,115,409 A * | 9/2000 | Upadhyay et al. | 375/144 |
| 6,137,788 A * | 10/2000 | Sawahashi et al. | 370/342 |
| 6,144,711 A * | 11/2000 | Raleigh et al. | 375/347 |
| 6,275,543 B1 | 8/2001 | Petrus et al. | 375/324 |
| 6,301,293 B1 * | 10/2001 | Huang et al. | 375/130 |
| 6,331,837 B1 * | 12/2001 | Shattil | 342/378 |
| 6,363,104 B1 * | 3/2002 | Bottomley | 375/148 |
| 6,393,073 B1 * | 5/2002 | Eilts | 375/340 |
| 6,456,647 B1 * | 9/2002 | Banister | 375/142 |
| 6,570,918 B1 | 5/2003 | Rademacher | |
| 6,618,433 B1 * | 9/2003 | Yellin | 375/148 |
| 6,721,293 B1 * | 4/2004 | Komulainen et al. | 370/335 |
| 6,768,747 B1 * | 7/2004 | Dogan | 370/509 |
| 6,782,036 B1 * | 8/2004 | Dowling et al. | 375/130 |

OTHER PUBLICATIONS

Park, Sheeyun; Sarkar, Tapan K. "A Blind Least-Squares Approach to STAP using MCARM Data". IEEE Signals, Systems & Computers. Nov. 1998. pp. 1552-1556.

Moshavi, Shimon. "Multi-User Detection for DS-CDMA Communications". IEEE Communications Magazine. Oct. 1996. pp. 124-136.

Sam, Phirin; USPTO Box PCT; "International Search Report" dated Aug. 21, 2001. 3 pgs.

* cited by examiner

PRIOR ART

COMBINED ADAPTIVE SPATIO-TEMPORAL PROCESSING AND MULTI-USER DETECTION FOR CDMA WIRELESS SYSTEMS

CROSS-REFERENCE TO RELATED APPLICATION

This application is a divisional application of U.S. patent application Ser. No. 09/813,491, filed Mar. 21, 2001, now abandoned, which claims the benefit of U.S. Provisional Application No. 60/190,803 filed Mar. 21, 2000.

FIELD OF THE INVENTION

This invention relates to wireless communication networks and more specifically to CDMA wireless systems subject to co-channel interference.

BACKGROUND OF THE INVENTION

Code Division Multiple Access (CDMA) networks are widely deployed throughout the world. The current implementations of CDMA typically follow the IS-95 industry standards and are referred to as IS-95 wireless systems. With the advent of enhancements to CDMA technology such as third generation CDMA, CDMA2000 and W-CDMA, the deployment of CDMA is expected to increase dramatically.

A typical CDMA system 100 is shown in FIG. 1. It is divided into a plurality of cells 121. Each cell contains a fixed base station 103. Each base station 103 is connected to a centralized switch or mobile switching center 109 that provides switching capabilities and acts as a gateway to wired networks such as the public switched telephone network (PSTN), the Internet, and other public and private data communications networks. As is known, the base station 103 includes a transmitter 105 and a receiver 107 for communicating with the mobile customers or users.

On the customer side, users connect to the wireless network through wireless mobile nodes 101 that can act as transmitters and receivers. The mobile nodes 101 communicate with the base stations 103 over wireless communications links. The link from a base station transmitter 105 to a mobile node receiver is the forward link 115 (or downlink). The link from the mobile node transmitter to a base station receiver 107 is referred to as the reverse link 113 (or uplink).

One advantage of CDMA over other wireless access systems is that all users share the same spectrum at the same time. However, the fact that multiple users occupy the same bandwidth limits performance and capacity. Because the conventional matched filter receiver 107 does an imperfect job of removing signals from these users, each user in a CDMA system degrades the performance of every other user; this effect is called multiple access interference or MAI. An increase in interference between users can lower the ability of a wireless provider to reuse frequencies, resulting in a reduction of system capacity. Because of the tremendous demand for wireless voice and data services and increased competition between service providers, CDMA network providers cannot afford such a reduction in system capacity. Therefore, wireless providers are continually striving to maximize system capacity, which in turn, requires limiting interference.

In CDMA wireless systems, power control is used to control the level of MAI at the base station. By adjusting every user's power so that all user transmissions arrive at the base station at approximately the same level, the base station receiver for each user sees the same amount of MAI, and the link quality is roughly the same for each user. If power control was not implemented, then a single user close to the base station could prevent the conventional CDMA receiver for other users from receiving a usable signal, resulting in the so-called near-far problem.

Power control works reasonably well for currently deployed CDMA wireless systems although limitations in the speed of power control are a constant engineering concern and limit capacity and link quality. However, there are frequently situations where it is desirable to deploy auxiliary receivers that are not the target of mobile station power control. Auxiliary receivers can be used to monitor the health of a CDMA wireless system or assist in geolocation. These auxiliary receivers may even be used by law enforcement and military operators for non-cooperative monitoring of a CDMA system for drug-interdiction, counter-terrorism and international intelligence gathering. In these cases, the auxiliary receiver must contend with a wide range of received power levels. Often the auxiliary receiver may need to receive a signal from a mobile station whose received power level is far below (30 dB or more) below the strongest arriving signal.

A need therefore exists for enabling a user in a CDMA system to receive user signals in the presence of interference from other users when the power level of all co-channel signals is not adjusted to be substantially the same.

SUMMARY OF THE INVENTION

In accordance with an aspect of our invention, we combine concepts from space-time adaptive processing (STAP), interference cancellation, and multi-user detection (MUD) in multiple embodiments that are able to extract low-level CDMA signals in dense multi-user environments. The performance of these embodiments depends on the accuracy of the signal reconstruction and cancellation. This is particularly crucial if there is a wide range in received power (e.g., from lack of power control). For example, if there is an interfering signal that is 30 dB stronger than the signal we wish to receive and this signal is cancelled with 90% accuracy (meaning that 90% of the interfering signal power is canceled), then the residual portion is still 20 dB above the desired signal. Thus, in addition to symbol detection accuracy, channel estimation accuracy becomes very important in reducing the cancellation residuals.

Our invention utilizes adaptive temporal reconstruction filter (ATRF) techniques for reconstructing the signal interference. This novel approach permits very accurate channel estimation and signal cancellation. Through our novel use of ATRF, individual multipath components do not need to be tracked and separately estimated. The ATRF recreates the multipath channel structure with accurate amplitude and phase estimates for each component. The use of cost estimation techniques within the ATRF further minimizes cancellation residuals. In addition, cancellation timing errors are mitigated because the filter weights do not need to be exactly centered around the main multipath peak in order to solve for them accurately.

There has been extensive work on combined successive interference cancellation and multi-user detection systems. Much of this work is focused on simple channel estimation techniques, such as averaging the outputs of the conventional detector's correlators in order to estimate the amplitude and phase of signals to cancel. The reasons for this are that this approach is simple to describe, simulate and implement and the focus is most often on applications where power control is available to the receiver. Thus, small inaccuracies in cancellation do not significantly affect the performance. Also, there are only a limited number of multipath components which are strong enough to be worth tracking and canceling.

There has also been some work on channel estimation for MUD with the more theoretical motivation of determining the limits of estimation accuracy. These works have often focused on complex maximum likelihood approaches. Because our invention applies successive interference cancellation to complex, non-discrete multipath channels encountered in the real world, our invention takes transmit filtering into account and compensates for timing errors. Our approach minimizes residuals and estimates all multipath components without the need to track them individually.

Through the addition of STAP, the receiver is able to spatially separate the signals using array (smart antenna) receiver technology. This allows the STAP receiver to place spatial beam pattern nulls on strong interferers. In addition, the STAP receiver combines multipath energy, including both the resolvable multipath that is captured by the rake receiver, as well as unresolved multipath that the rake receiver cannot effectively exploit. We combine these techniques with MUD approaches, where the receiver jointly operates on the received waveform to extract signals for all users simultaneously. By carefully estimating higher level signals and canceling them from the array data for the STAP receivers for lower-level signals, the combined STAP-MUD approach is much more effective than either approach implemented individually.

In multi-user detection (MUD), code, timing and possibly channel information associated with multiple users are jointly used to better detect each individual user. Thus, at the outputs of a conventional MUD detector, each user sees less multiple access interference and enjoys improved performance. One form of multi-user detection known as interference cancellation estimates, reconstructs and subtracts interfering signals out of the received signal. Unlike the traditional CDMA detectors, interference cancellation MUD utilizes information about other users when detecting a single user. One aspect of our invention is the novel combination of these interference cancellation MUD techniques and adaptive minimum cost channel estimation in the reconstruction of signals. This combination improves performance of signal reconstruction including symbol detection accuracy and channel estimation fidelity.

Using this combination, we have demonstrated that the STAP-MUD receiver can operate independently of power control, extracting waveforms that are over 35 dB below the strongest arriving CDMA signals.

DETAILED DESCRIPTION OF PREFERRED EMBODIMENTS

Figure 1:
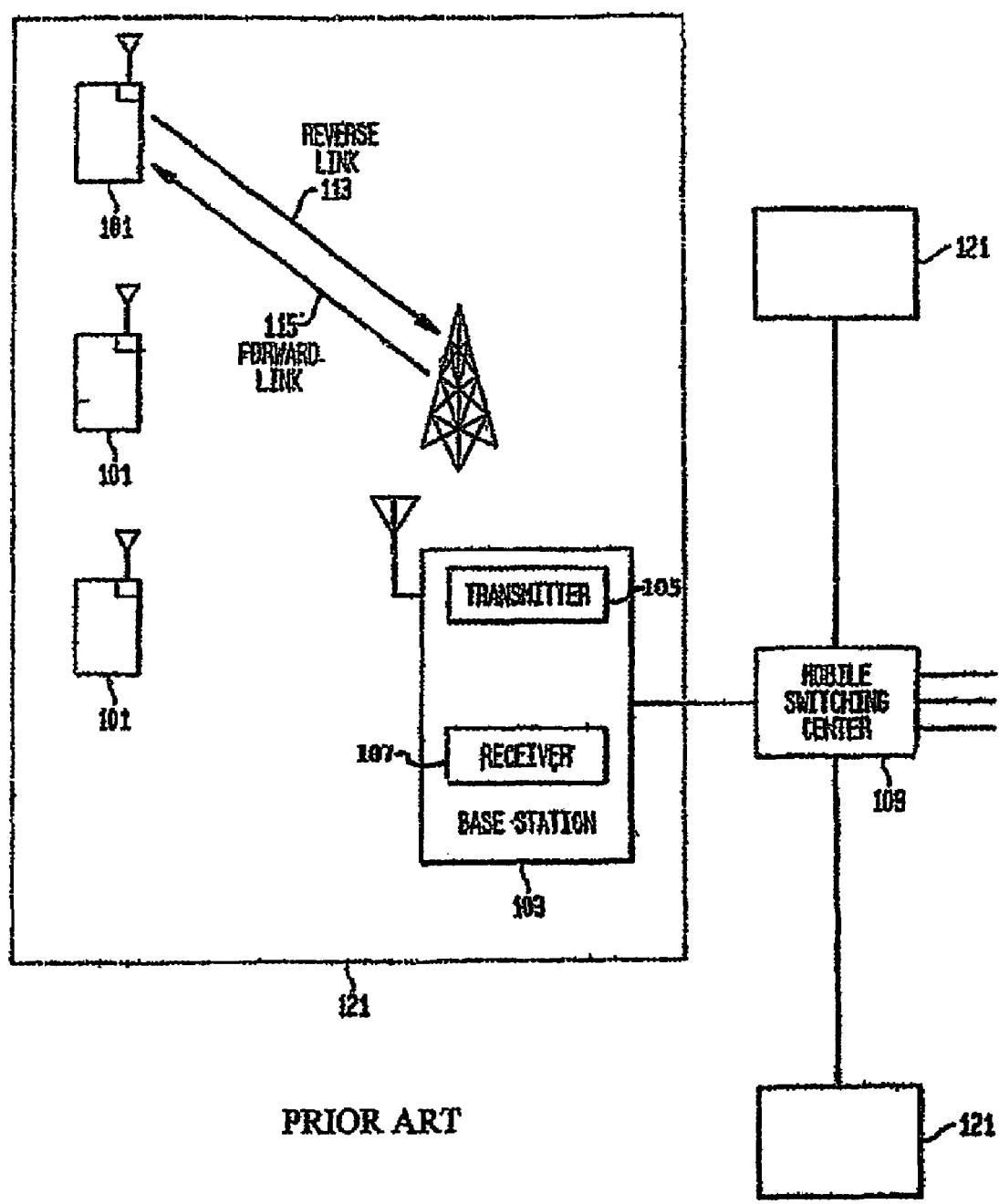
FIG. 1 is a network diagram illustrating a typical wireless CDMA network.
Figure 2:
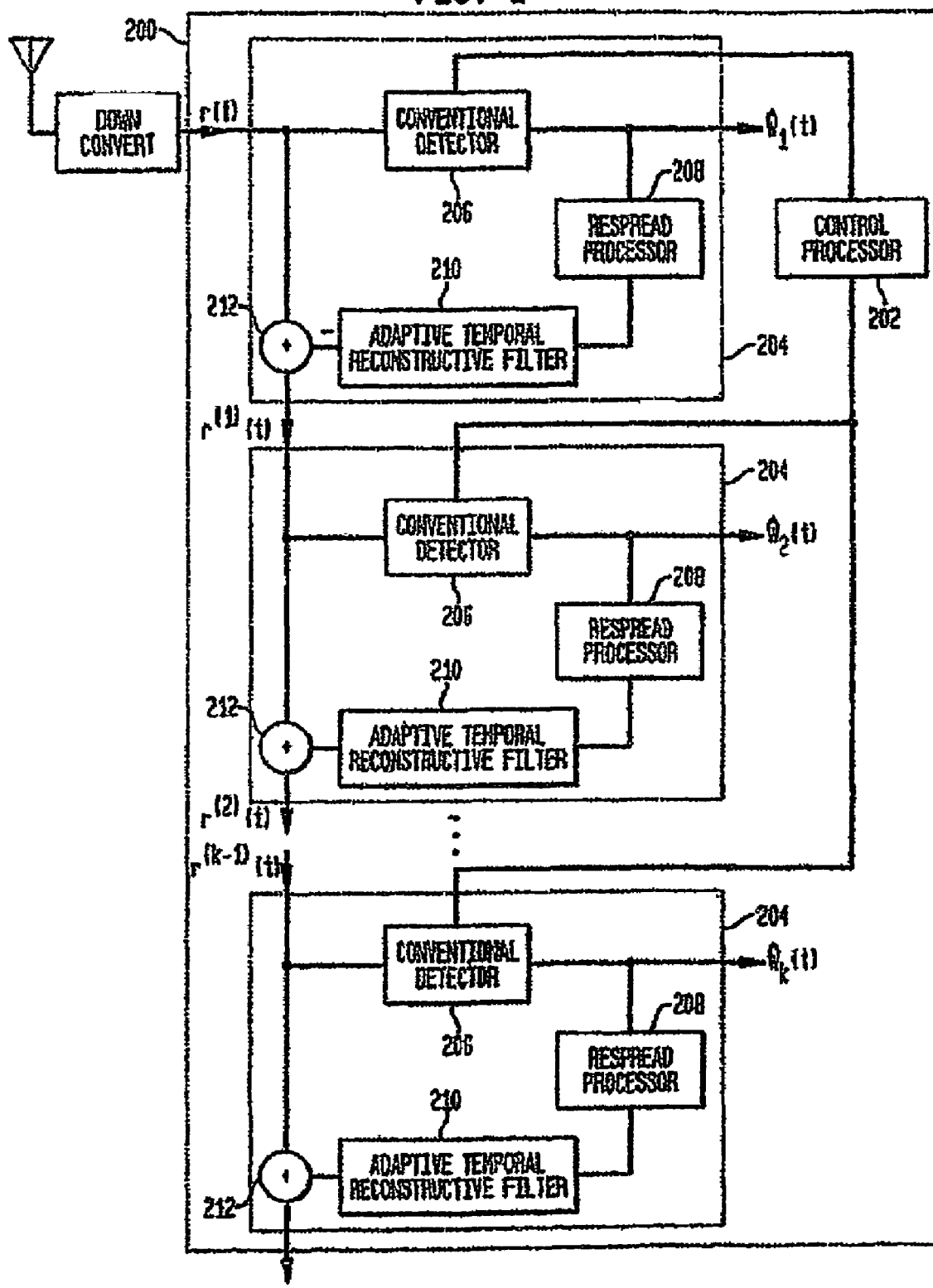
FIG. 2 is a network diagram of an illustrative embodiment of a SIC-MCCE combination system in accordance with our invention.

I. Interference Cancellation MUD Combined with Adaptive Temporal Channel Estimation Interference cancellation can take the form of either successive interference cancellation or parallel interference cancellation. FIG. 2 depicts one illustrative embodiment of our invention comprising a system 200 combining successive interference cancellation (SIC) and adaptive minimum cost channel estimation (MCCE) for enabling a CDMA receiver to receive signals at different power levels in the presence of interference from other users. We shall refer to this combination as the SIC-MCCE system. The SIC-MCCE system 200 can be implemented as a component within an auxiliary CDMA receiver or within a CDMA base station receiver system.

The illustrative system of FIG. 2 comprises a control processor 202 and a plurality of processors 204 combining successive interference cancellation (SIC) multi-user detection and adaptive temporal reconstruction filters (ATRF). The plurality of SIC-ATRF processors 204 are arranged in successive stages. At each stage, the next user is decisioned, respread, temporally reconstructed, and subtracted out by the SIC-ATRF processor associated with that stage. The output of the SIC-ATRF processor in the first stage, a cleaned received signal, is used as the input to the SIC-ATRF processor in the second stage and the output of the processor in the second stage is used as input to the processor in the next stage. This arrangement is continued for each stage. The number of stages used by the SIC-MCCE system is determined based on the total number of users for the system.

Each SIC-ATRF processor 204 includes a conventional detector 206, a respread processor 208, an adaptive temporal reconstruction filter (ATRF) 210, and a mathematical operations processor 212. The conventional detector 206 is connected to the respread processor 208 and the mathematical operations processor 212 of the SIC-ATRF processor 204 in the previous stage. For the SIC-ATRF processor 204 in the first stage, the conventional detector 206 is connected to an external entity providing a processed version of the received signal r(t) and to the respread processor 208. The respread processor 208 is in turn connected to the ATRF 210, which is connected to the mathematical operations processor 212. The output of the mathematical operations processor 212 is connected to the conventional detector 206 of the SIC-ATRF processor 204 of the next stage and the mathematical operations processor 212 of the next stage. For the SIC-ATRE processor 204 in the first stage, the mathematical operations processor 212 is connected to the external entity providing a processed version of the received signal r(t) instead of the mathematical operations processor 212 of a previous stage.

Figure 3:
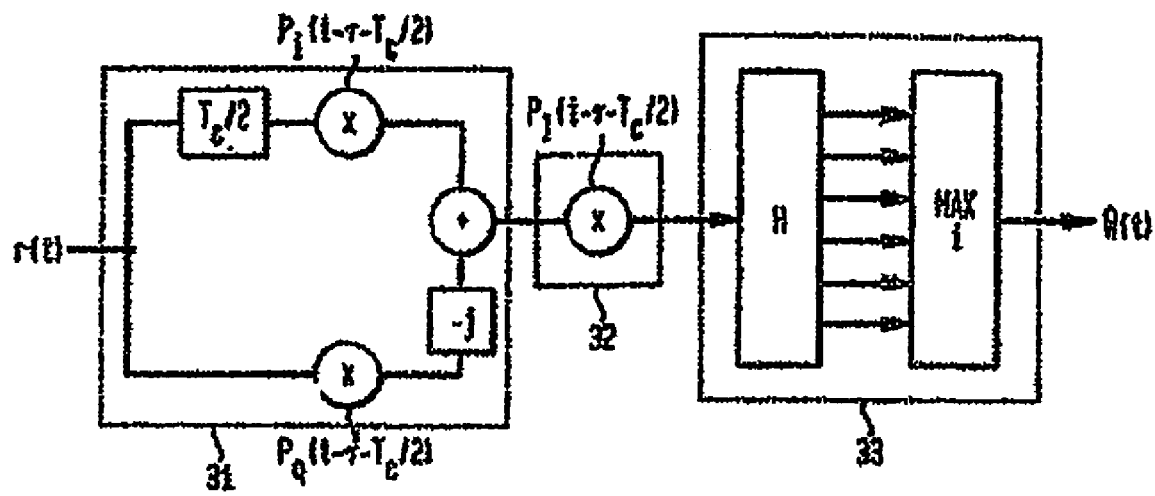
FIG. 3 depicts an illustrative conventional detector for the combination of FIG. 2.
Figure 4:
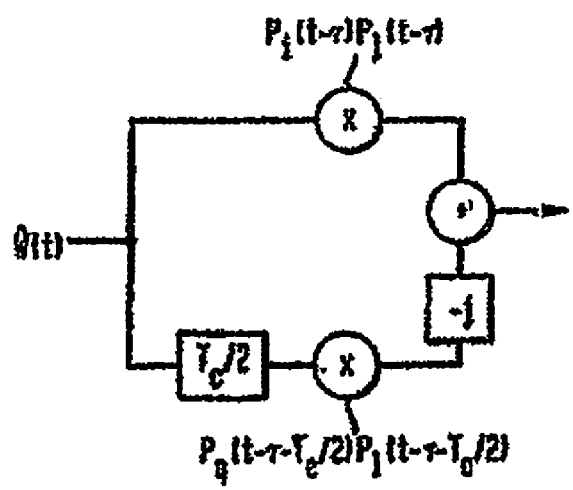
FIG. 4 depicts an illustrative respread processor for the combination of FIG. 2.

The exact format of the conventional detector and respread processor will differ based on the modulation, coding, and spreading schemes of the particular CDMA system utilized in the wireless receiver system. Although the conventional detector and respread processor can be designed based on third generation CDMA, CDMA2000, or W-CDMA technology, FIGS. 3 and 4 are block diagrams of the conventional detector 206 and respread processor 208 of the embodiment of FIG. 2 according to an illustrative IS-95 implementation. In this implementation, the conventional detector can be an IS-95 conventional detector or an IS-95 rake conventional detector.

The IS-95 conventional detector 206, shown in FIG. 3, is a fundamental component of standard IS-95 receivers. The IS-95 conventional detector 206 comprises three parts: a short code despreader 31, a long code despreader 32, and a 64-ary matched filter bank 33. The short code despreader 31 separately multiplies the received signal by the real and imaginary components of the IS-95 short code, denoted by $p_i(t)$ and $p_q(t)$. The delays of these components are adjusted to match the offset in time of the intended received signal. Next, the resulting despread signals are recombined, using time delays as illustrated in FIG. 3, and multiplied by a local copy of the long code, $p_l(t)$ corresponding to the desired user in the long code despreader 32. The long code is also offset according to the expected delay of the arriving signal. The resulting signal is used as input to a 64-ary matched filter bank 33. The 64-ary matched filter bank 33 contains copies of each of the 64 possible Walsh symbols that could be transmitted during a symbol period. The 64 outputs of the matched filter bank contain the squares of the absolute values of the inner products between the signal at the matched filter bank input and each of these 64 potential symbols. This process may be equally accomplished using a Walsh-Hadamard transform. When the IS-95 conventional detector is used alone, the matched filter bank output with the largest value determines the receiver's estimate of the transmitted symbol during a particular symbol period.

The IS-95 conventional rake detector, a standard technique employed in practice, embodies several instantiations of the IS-95 conventional detector. Each detector uses the same long and short code, however a different delay is applied to each constituent IS-95 conventional detection. The delays correspond to different multipath components, so that a different IS-95 conventional detector tracks each significant multipath component. The outputs from the 64-ary matched filter banks of each of the IS-95 conventional detectors are combined in the IS-95 rake conventional detector using a non-coherent combining technique. Several non-coherent combining techniques are available; however, a simple example is thee equal-gain combiner, in which the power from the corresponding ports from each of the 64 matched filter bank outputs in the constituent IS-95 conventional detectors are added, resulting in 64 new variables. These variables are compared, and the one with the largest power is selected as the receiver's estimate of the transmitted symbol from a 64-ary alphabet.

The respread processor 208, shown in FIG. 4, is used as a fundamental component of IS-95 receivers employing interference cancellation. The respread processor 208 uses as inputs the symbol decisions obtained from either the IS-95 conventional detector, the IS-95 conventional rake detector, or the IS-95 STAP detector, or other similar sources. The respread processor creates a symbol from the 64-ary alphabet corresponding to the selected symbol. Next the symbol is spread using the IS-95 long code, $p_l(t)$, then the result is spread using the complex short code using the offset quadrature method specified in the IS-95 standard. The respread processor then matches the resulting signal to the signal received from the antenna using minimum mean square error techniques.

Figure 5:
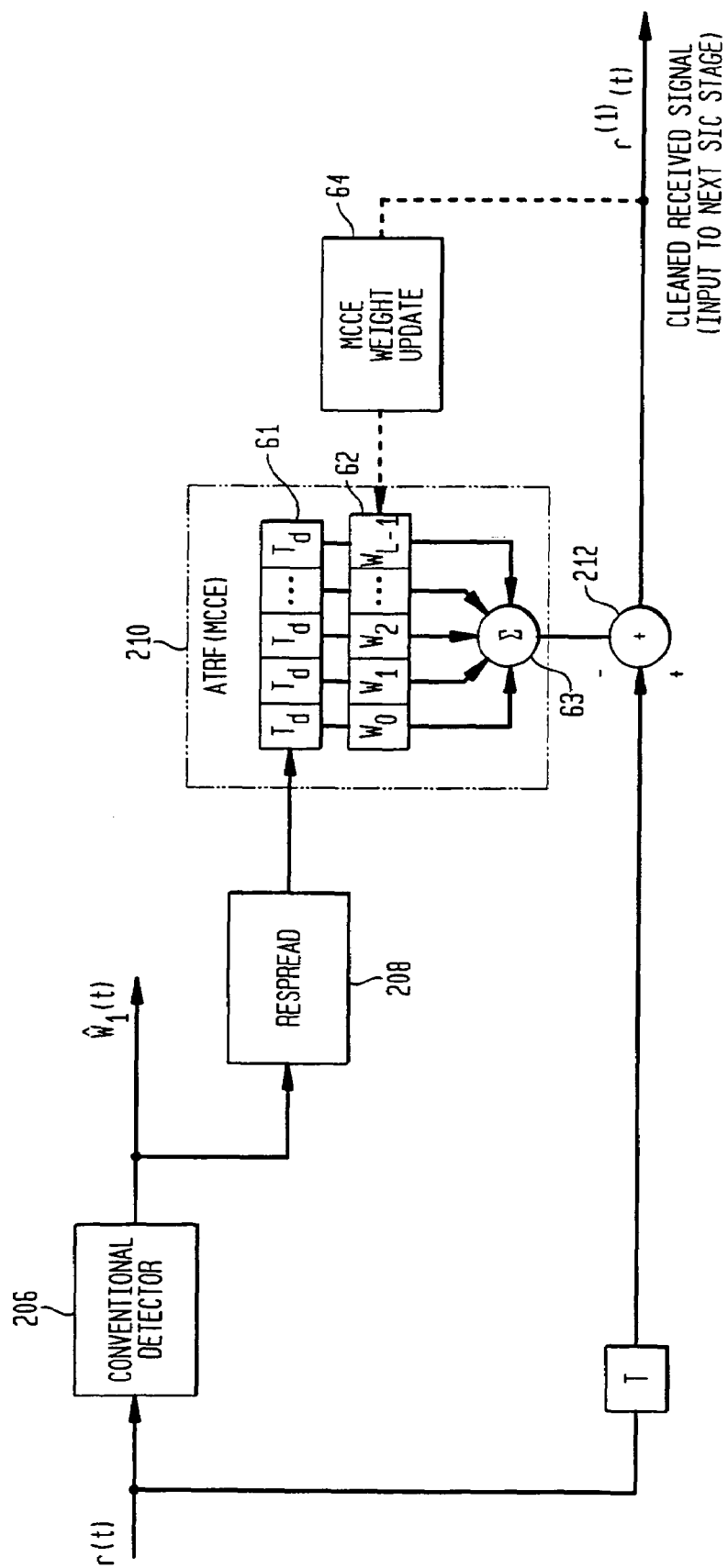
FIG. 5 depicts an illustrative adaptive temporal filter (ATRF) for the combination of FIG. 2.
Figure 6:
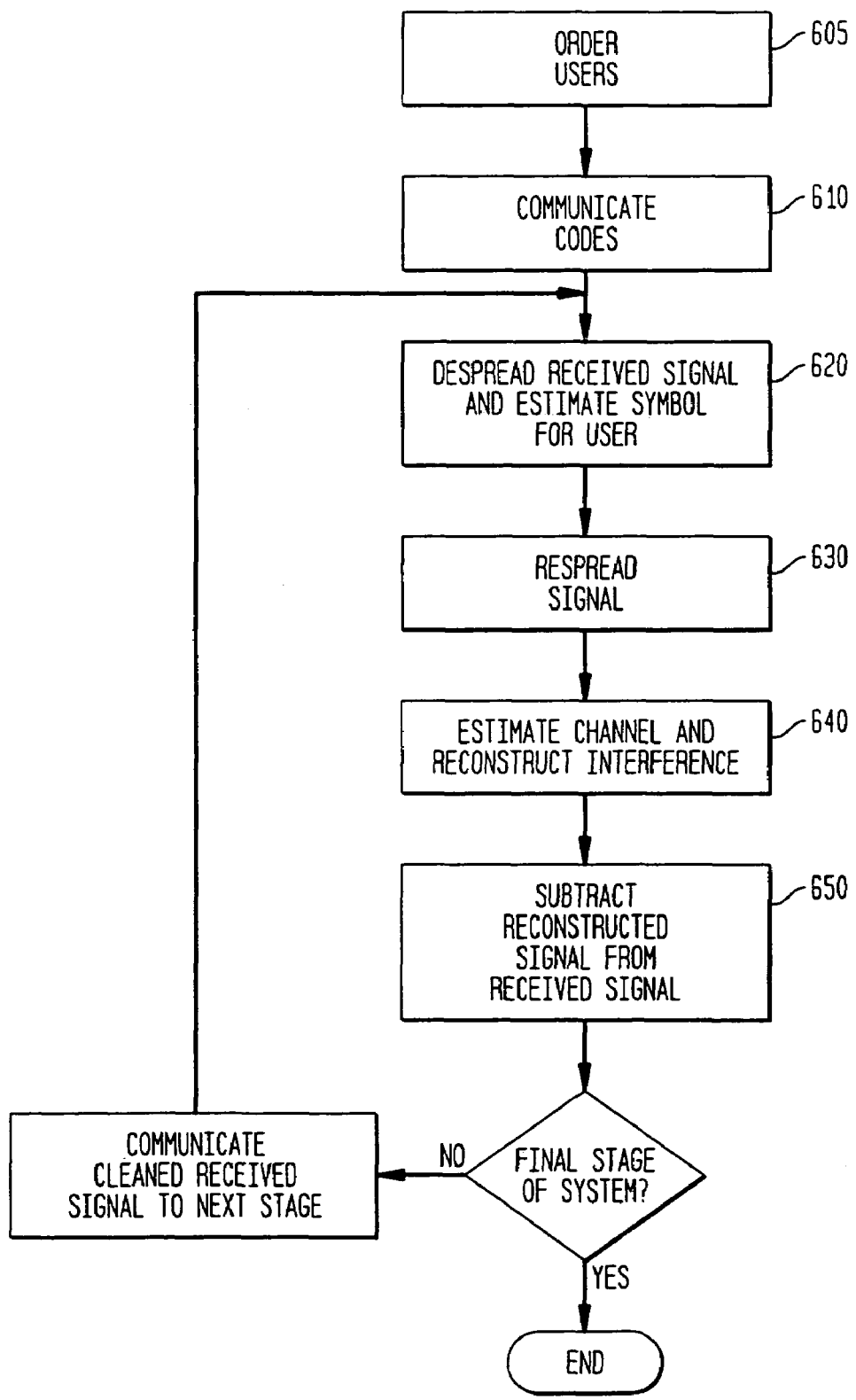
FIG. 6 is a flow diagram illustrating a method of operation for the SIC-MCCE combination system of FIG. 2.

FIG. 5 is a block diagram of the ATRF 210 of the embodiment of FIG. 2. The ATRF 210 comprises tap weights 62, a tap delay line 61, and a mathematical summing circuit 63. In addition, the ATRF has an MCCE weight update processor 64. This processor may be located within the ATRF or as a separate entity between the mathematical operations processor 212 and the ATRF 210 as shown in FIG. 6. The tap weights contain the amplitude, phase, and multipath structure of the received signal for the kth user. The length of the ATRF should be at least as long as the transmit filter (e.g., for IS-95 the transmit filter is 12 chips in duration), and ideally should be long enough to accommodate the delay spread of the signal (to recreate all multipath components).

FIG. 6 shows a flow diagram of the operation of the system 200 of our invention. After initial processing such as down-conversion to baseband is performed on the received signal by an external entity, the control processor 202 orders the user signals according to a pre-defined methodology (step 605). The user signals are then assigned to a stage based on the ordering. For example, the signal for user A is assigned to the first stage; the signal for user B is assigned to the second stage; and the signal for user k is assigned to the $k^{th}$ stage.

An illustrative methodology ranks signals in descending order of received powers. An advantage of this methodology is that by canceling the strongest users first, the remaining users receive the largest benefit from MAI reduction. In alternative methodology, the control processor identifies signals above a certain threshold without performing a hard ranking of each signal.

Based on the ordering, the control processor 202 communicates a separate user code to the conventional detector 206 in each stage of the system (step 610). For example, the first stage receives the user code associated with user A. In the first stage of the system 200, the conventional detector 206 despreads the received signal and estimates the symbol transmitted for the identified user, $\hat{W}_1(t)$ (step 620). The technique used in the IS-95 conventional detector and IS-95 rake conventional detector is discussed above.

In step 630, the symbol estimate generated by the conventional detector 206 is mixed with the user codes in the respread processor 208 to generate a scaled estimate of the transmitted signal for the user. Using the scaled estimate as input, the ATRF 210 estimates the channel for the user, (i.e., the multipath components and their associated amplitudes and phases) and reconstructs the signal interference associated with the user signal (step 640). The reconstructed signal for the user is then cancelled from the total received signal r(t) in the mathematical operations processor 212 (step 650). The output of the mathematical operations processor 212 is then input to the SIC-ATRF processor 204 in the next stage of SIC-MCCE system 200. The output is also fed back to the MCCE weight update processor 64. Steps 620 through 650 are successively repeated for each of the k stages.

A more detailed description of the basic SIC-MCCE channel estimation and reconstruction performed in the ATRF 210 is described below. In a preferred embodiment, the adaptive technique used for channel estimation is based on minimum cost estimation techniques.

In basic SIC-MCCE channel estimation (step 640 in FIG. 6), the MCCE weight update processor 64 determines the adaptive filter tap weights 62 that minimize a pre-determined cost function between the received signal and the output of the adaptive filter. In an illustrative mode of operation, the MCCE weight update processor 64 functions as follows. The output of the jth stage is given by:

$$r^{(j)}(lT_s) = r(lT_s) - \sum_{k=0}^{j-1}\sum_{n=0}^{N-1} w_{k,n}\hat{s}_k((k-n)T_s)$$

this is expressed in vector form as:

$$r_l^{(j)} = r_l - w^H B_l^H$$

where $r_l$ is the vector of received signals at time index I, and samples of the reconstructed waveform are contained in the vector:

$$\hat{s}_{k,n} = [\hat{s}_k(nT_s)\hat{s}_k((n+1)T_s)\ldots\hat{s}_k((n+Q-1)T_s)]$$

$$\hat{S}_{k,l} = \begin{bmatrix} \hat{s}_{k,l} \\ \hat{s}_{k,l-1} \\ \vdots \\ \hat{s}_{k,l-N+1} \end{bmatrix} \quad B_l^H = \begin{bmatrix} \hat{S}_{0,l} \\ \vdots \\ \hat{S}_{j-1,l} \end{bmatrix}$$

Different weight vectors can be obtained by using minimizing different cost functions, each of which represents the quality of the performance of the SIC stage in some manner. One implementation of the minimum cost channel estimate solution is the minimum mean square error solution. The minimum mean square error solution for the weight vector w is the solution that minimizes the following cost function:

$$J(w) = |r_l^{(j)}|^2 = |r_l - w^H B_l^H|^2$$

which simultaneously minimizes both the residual at the output of the $j^{th}$ stage of the SIC receiver and the difference between the ATRF filter output and the received data $r_l$. The solution to this problem is obtained using standard techniques, where we obtain:

$$w = (B_l^H B_l) B_l^H r_l^H$$

Figure 7:
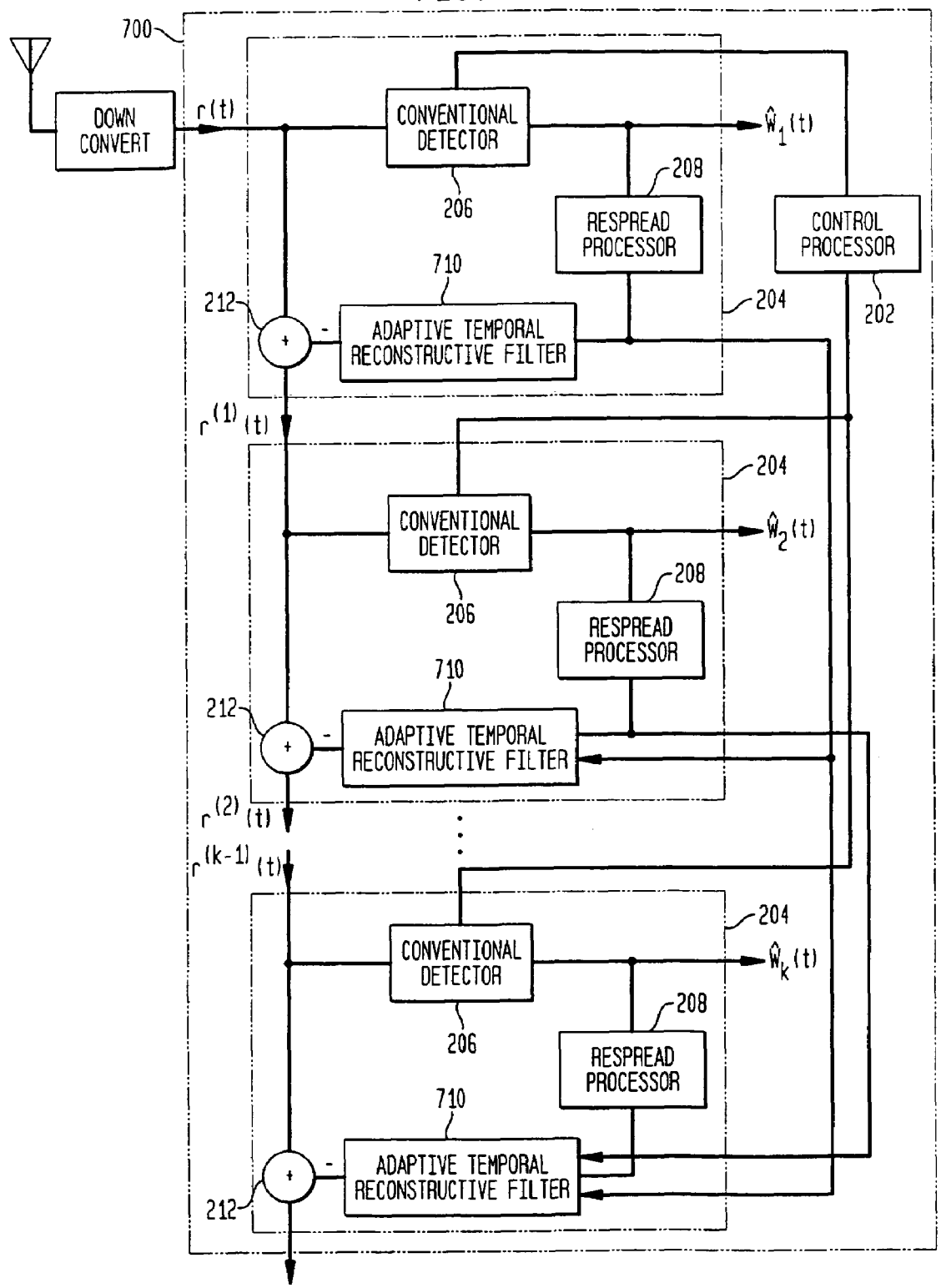
FIG. 7 is a network diagram of an illustrative embodiment of a SIC-JMCCE combination system in accordance with our invention.

Since this solution minimizes the mean square error between the ATRF output and the received data at this input to the stage, this is called the minimum mean square error (MMSE) solution. In an alternate illustrative embodiment of our invention, the channel is estimated jointly over multiple users. We will refer to this combination of a jointly optimized ATRF and SIC multi-user detection as the SIC-JMCCE system. An illustrative multi-stage SIC-JMCCE system is shown in FIG. 7. The SIC-JMCCE system 700 comprises a similar structure as the SIC-MCCE system 200. However, in the SIC-JMCCE system 700, the outputs of the respread processors 208 for all previous stages are communicated as inputs to the ATRF 710 of the current stage. For example, the SIC-ATRF processor 204 in the third stage of a SIC-JMCCE system 700 uses the output of the first stage respread processor 208 and the second stage respread processor 208 as inputs to the third stage ATRF 710.

The mode of operation in accordance with the SIC-JMCCE system 700 is as described above for the SIC-MCCE system 200, FIG. 6. However, the channel estimation step 640 is modified to estimate the channel over multiple users. During channel estimation, the tap weights 62 of the current stage ATRF 710 are determined by jointly minimizing the cost function between the received signal and the sum of the outputs of the ATRFs 710 of previously completed stages. The ATRF 710 for each stage jointly estimates and reconstructs all of the currently detected signals including those detected in previous stages of the SIC-JMCCE system 700. Thus, the symbols of a single user are detected in each stage (step 620), but the temporal signal structures of all previous detected users are re-estimated and cancelled at each stage. At step 650, the output of the current stage ATRF 710 consisting of all the currently detected signals is subtracted from the received signal in the mathematical operations processor 212.

Figure 8:
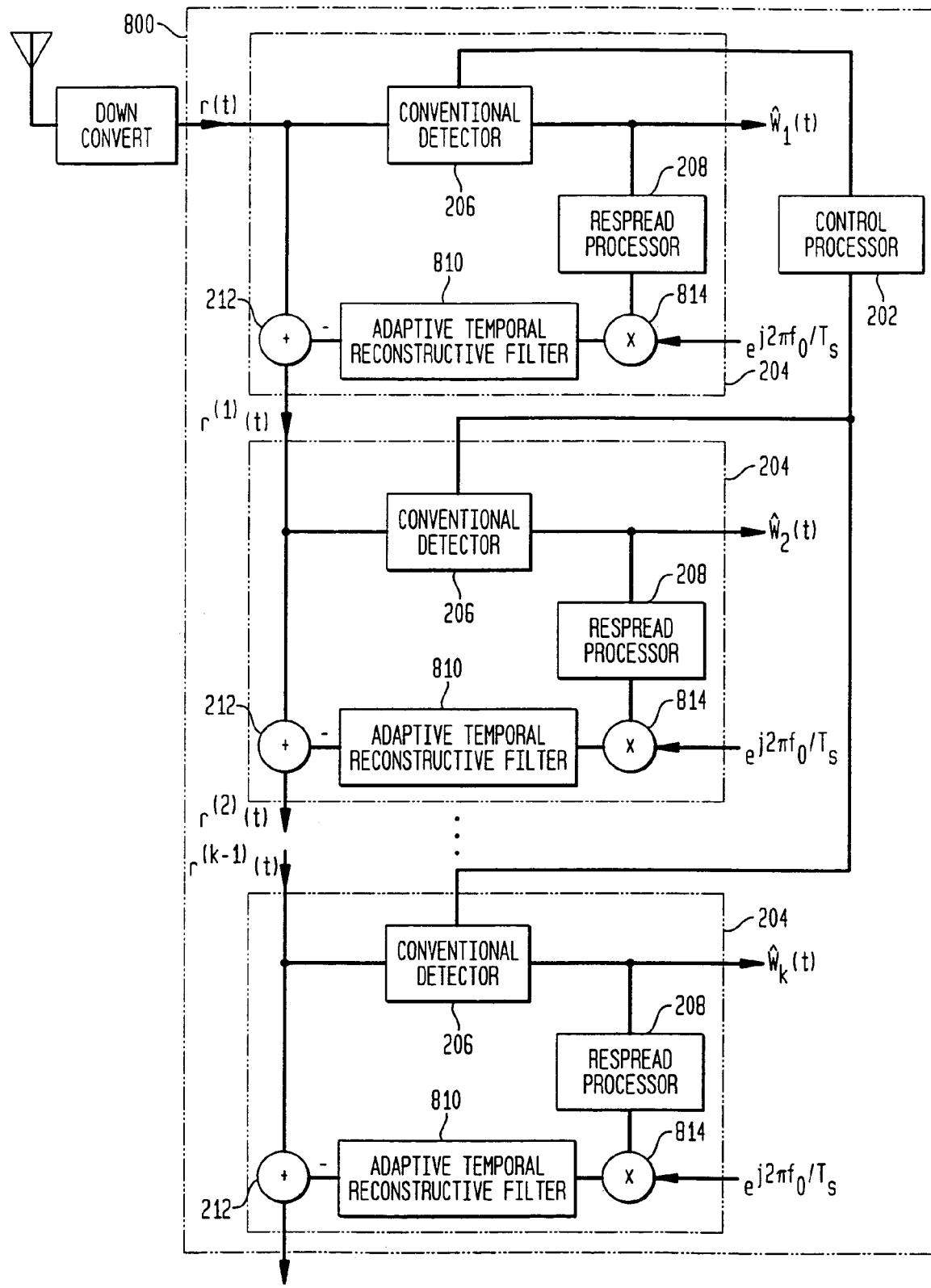
FIG. 8 is a network diagram of an illustrative embodiment of a SIC-MF-MCCE combination system in accordance with our invention.

The above approaches to channel estimation in accordance with our invention reconstruct the temporal structure of the signals. However, these approaches do not take into account the frequency content of the signals. In another illustrative embodiment, the ATRE is extended to take into account Doppler spread. We refer to this combination of SIC multi-user detection and multiple frequency adaptive reconstruction as a SIC-MF-MCCE system 800. The SIC-MF-MCCE system 800 can be implemented either in an independent or joint arrangement. An independent SIC-MF-MCCE system 800 is shown in FIG. 8. In this arrangement, a frequency shift processor 814 is connected between the respread processor 208 and the ATRF 810 in each stage of the system.

Figure 8A:
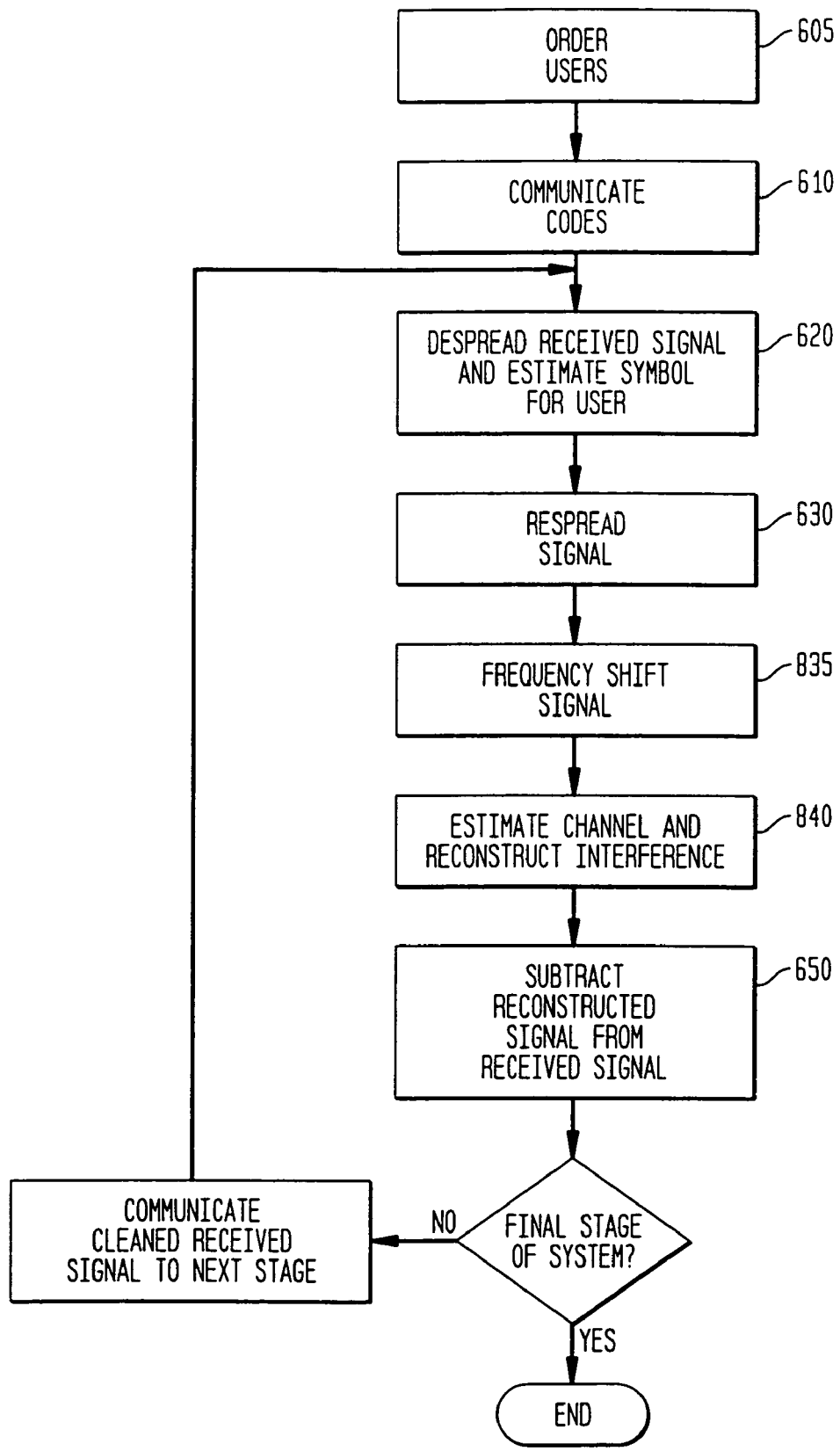
FIG. 8a is a flow diagram illustrating a method of operation for the SIC-MF-MCCE combination system of FIG. 8.

The mode of operation in accordance with the independent SIC-MF-MCCE system 800 is shown in FIG. 8a. In this mode, steps 605 through 630 are identical to those described for the SIC-MCCE and SIC-JMCCE systems 200, 700. However, an additional step (step 835) is added to shift the frequency of the signal output from the respread processor 208 to take into account Doppler spread and un-compensated frequency tracking errors. The output of the frequency shift processor 814 is then used as input to the MCCE weight update processor 64. At step 840, the ATRF 810 estimates the channel using either the basic or joint technique previously discussed. The following is a more detailed description of the operation of the ATRF 810 in accordance with a preferred embodiment of our invention. $\hat{s}_{k,p,n}$ represents a row vector containing Q samples of the reconstructed signal for user k, from time $nT_s$ to $(n+Q-1)T_s$, and frequency shifted by $(p-P/2)/(QT_s)$ Hz:

$$\hat{s}_{k,p,n} = \left[\hat{s}_k(nT_s)e^{j2\pi(p-\frac{P}{2})(n)/Q}\hat{s}((n+1)T_s)e^{j2\pi(p-\frac{P}{2})(n+1)/Q}\ldots\right.$$
$$\left.\hat{s}((n+Q-1)T_s)e^{j2\pi(p-\frac{P}{2})(n+Q-1)/Q}\right]$$

$r_1$ represents a row vector containing the Q samples of the received signal, $r(nT_s)$ through $r((n+Q-1)T_s)$. Then at stage j, the cleaned signal is:

$$r_1^{(j)} = r_1 - w^H B_1$$

where $$B_l = \begin{bmatrix} A_{0,l} \\ \vdots \\ A_{j-1,l} \end{bmatrix}, A_{k,j} = \begin{bmatrix} \hat{S}_{k,0,l} \\ \vdots \\ \hat{S}_{k,P-1,l} \end{bmatrix}, \hat{S}_{k,p,l} = \begin{bmatrix} \hat{S}_{k,p,l+N/2} \\ \hat{S}_{k,p,l+N/2-1} \\ \vdots \\ \hat{S}_{k,p,l+N/2}+1 \end{bmatrix}$$

Using these equations, the ATRF 810 determines the filter tap weight vector that minimizes the cost function set for the ATRF 810. For example, where a minimum mean square error cost function is used, the ATRF 810 determines the weight vector according to the following equations.

$$J(w) = \|r_1 - w^H B_1\|^2$$

which gives:

$$w = (B_l B_1^H)^{-1} B_l r_1^H$$

The ATRF 810 applies this weight vector to the delayed and frequency shifted version of the signal received from the previous stage (or the antenna input if this is the first stage).

The SIC detection approach is particularly attractive where there is a wide range in received powers (e.g., due to lack of power control). The SIC approach exploits the power distribution by canceling based on signal strength ordering. For applications where signals are received at about the same power (e.g., through power control), the PIC approach is often preferable.

Figure 9:
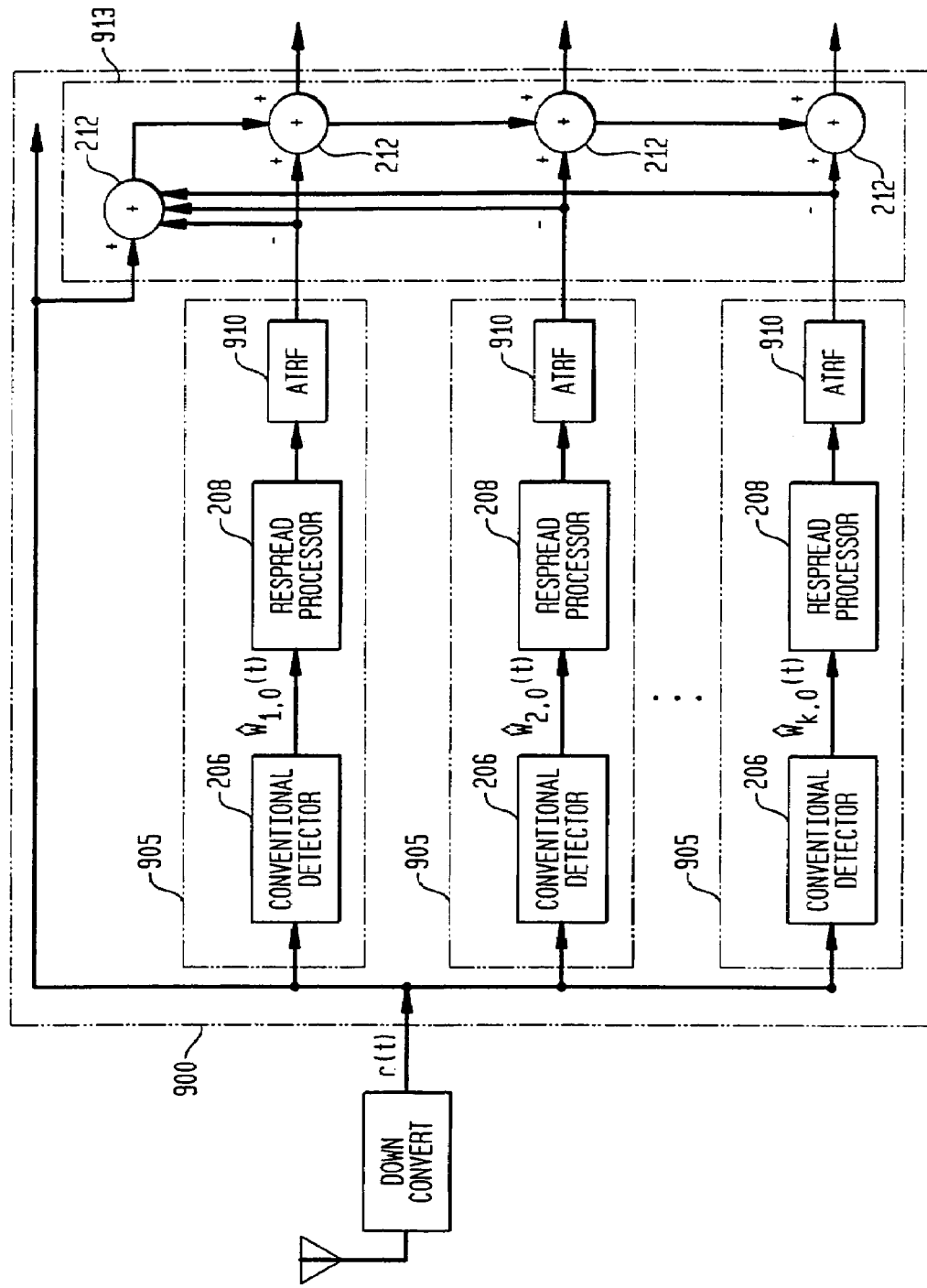
FIG. 9 is a network diagram of an illustrative embodiment of a PIC-MCCE combination system in accordance with our invention.

The combination of interference cancellation and ATRF channel estimation can also be extended to parallel interference cancellation techniques. FIG. 9 depicts one stage of a system 900 combining parallel interference cancellation (PIC) and adaptive minimum cost channel estimation (MCCE) according to a further specific illustrative embodiment of our invention. We shall refer to this system as a PIC-MCCE system. In the PIC-MCCE system 900, rather than detecting one additional user at each stage of the detector as in the SIC-MCCE system 200, every user is detected anew at each stage.

The PIC-MCCE system 900 includes a plurality of parallel processors 905. The number of processors can vary but is typically determined by the number of users associated with the system. Each processor is comprised of a conventional detector 206, a respread processor 208 and an ATRF 910. The conventional detector 206 in each parallel processor 905 is connected to a respread processor 208 and to a single external entity that communicates the received signal r(t) as input to the conventional detector. The ATRF 910 in each parallel processor 905 is connected between a respread processor 208 and a series 913 of mathematical operations processors 212. Alternatively, a partial summer circuit could be substituted for the series of mathematical operations processors. The series 913 of mathematical operations processors 212 (or alternatively the partial summer circuit) is connected to the ATRF 910 in every parallel processor 905 and to the external entity providing the received signal.

The conventional detector 206 and the respread processor 208 are identical to the conventional detector 206 and respread processor 208 used in the SIC-MCCE embodiment. In addition, a control processor could optionally be included to provide ordering of the signals prior to processing by the PIC-MCCE system 900.

Figure 10:
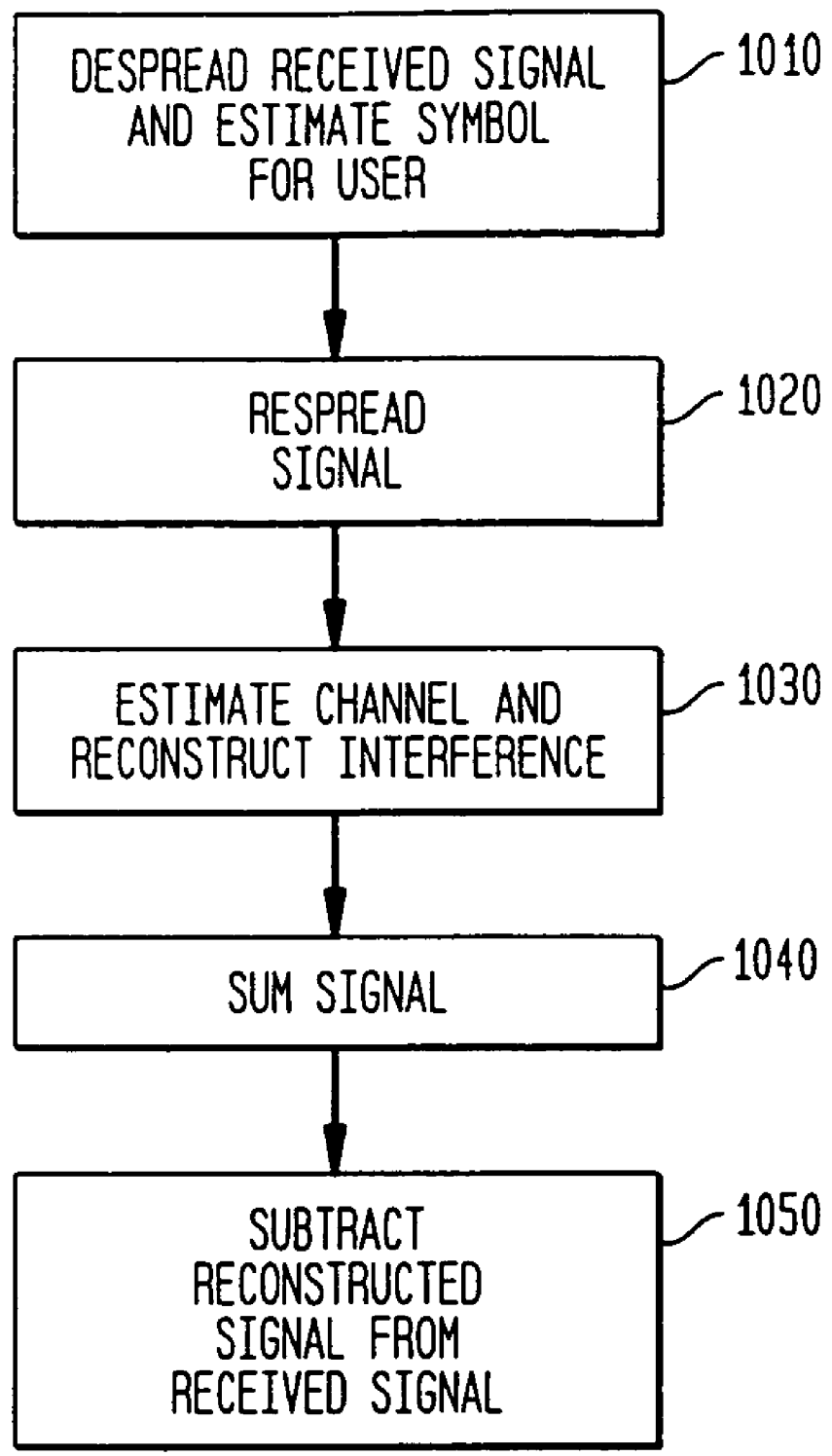
FIG. 10 is a flow diagram illustrating a method of operation for the PIC-MCCE combination of FIG. 9.

FIG. 10 shows a flow diagram of the operation of each processor 905 of the embodiment of FIG. 9. After initial processing such as downconversion to baseband is performed on the received signal by an external entity, the received signal is sent in parallel to each of the processors 905 in the first stage of the PIC-MCCE system 900. The conventional detector 206 in each processor 905 determines the initial symbol decision estimate for the user assigned to that processor 905 (step 1010). In each processor 905, the initial symbol estimate is communicated to the respread processor 208. The respread processor 208 generates a scaled estimate of the transmitted signal waveform for the user (step 1020). After respreading, each user is temporally reconstructed in the ATRF 910 (step 1030).

The outputs from the ATRF 910 in each processor 905 are sent in parallel to the series 913 of mathematical operations processors 212 (or alternatively to the partial summer). The mathematical operations processors 212 sum up all signals but one for each output, thus, forming an estimate of the interference for each user (step 1040). This interference estimate is then subtracted out of the received signal (step 1050). This process can be repeated for multiple PIC stages until the signal converges. At each stage, different numbers of users are successfully detected. Typically, as the number of stages increases, the number of users successfully detected increases, although oscillatory conditions can also occur. We define convergence as occurring at the stage after which no substantial increase is obtained in the number of successfully detected stages. The number of repetitions can be fixed or under dynamic control. Due to the computational complexity of repeating the PIC-MCCE stages, a preferred implementation defines the optimal number of repetitions.

A first approach to channel estimation in the PIC structure is the same as described above for basic SIC-MCCE channel estimation. A joint MCCE channel estimation approach, described above for the SIC-JMCCE system, can also be applied to the parallel structure. We refer to this system as PIC-JMCCE.

Figure 11A:
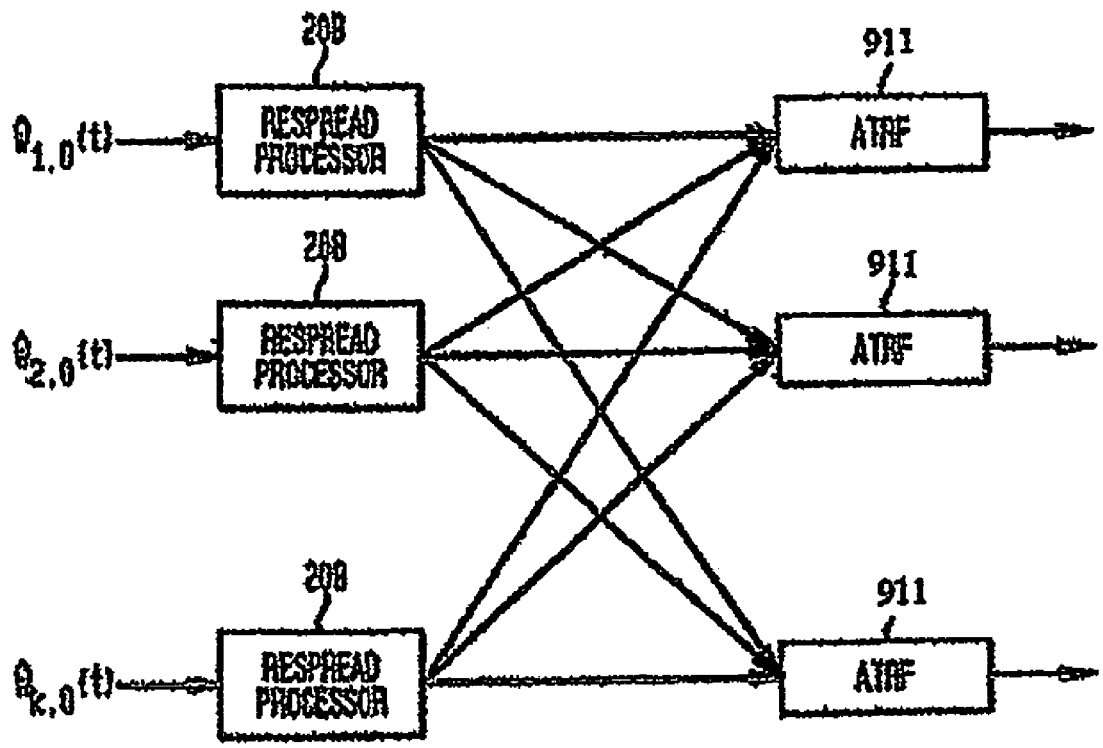
FIG. 11a is a partial network diagram of an illustrative embodiment of a PIC-JMCCE combination system comprising an ATRF in each parallel processor in accordance with our invention.

A partial PIC-JMCCE system is shown in FIG. 11A according to an illustrative embodiment of our invention. In this embodiment, each processor 905 of the PIC-JMCCE system has an individual ATRF 911. In a system with k users, each ATRF 911 receives k input signals, one from each of the respread processors 208 in the other parallel processors 905. Each ATRE 911 processes the signals as described above for step 640 of SIC-JMCCE processing.

Figure 11B:
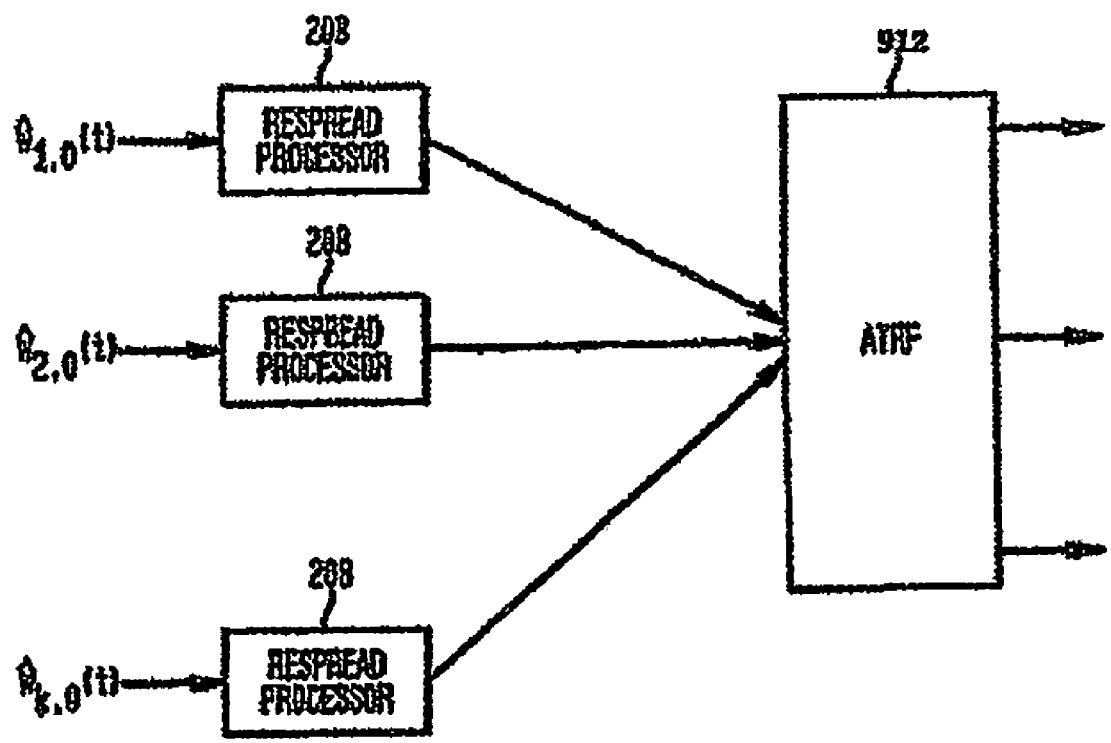
FIG. 11b is a partial network diagram of an illustrative embodiment of a PIC-JMCCE combination system comprising a single ATRF processor in accordance with our invention.

An alternative embodiment of the PIC-JMCCE system is shown in FIG. 11B, having a single ATRF 912. In this embodiment, each processor 905 has a conventional detector 206 and a respread processor 208. The output of the respread processor 208 in every parallel processor 905 is communicated as input to the single ATRF 912. In the PIC-JMCCE receiver, since the channels are estimated simultaneously for all successfully detected signals, only a single ATRF module is needed at each state, however, this ATRF module produces channel estimates for all signals. After reconstruction, the ATRF outputs the signal interference associated with each user to the series of mathematical operations processors 913.

A third approach to channel estimation, PIC-MF-MCCE, extends the ATRF to account for Doppler spread. This approach is identical to the approach described above for SIC-MF-MCCE. In the PIC-MF-MCCE arrangement, a frequency shift processor 814 is connected between the respread processor 208 and the ATRF 810 in each parallel processor 905 of the system.

The above embodiment assumes that all signals are used in the PIC-MCCE system at each stage. This condition can be relaxed to include groups of signals at each stage. For example, a control processor could be used to order the received signals in groups of similar power and successively detect groups of users in parallel. Similarly, the PIC-JMCCE system need not include all previously detected signals at each stage, but possibly, some subset of them.

II. Application of STAP to Systems Without a Pilot Reference Signal

Through the use of space time adaptive processing (STAP), a receiver is able to spatially separate user signals using array (smart antenna) receiver technology. This feature allows a STAP receiver to place spatial beam pattern nulls on strong interferers. In addition, the STAP receiver combines multipath energy, including both the resolvable multipath that is captured by a rake receiver, as well as unresolved multipath that the rake receiver cannot effectively exploit.

Figure 12:
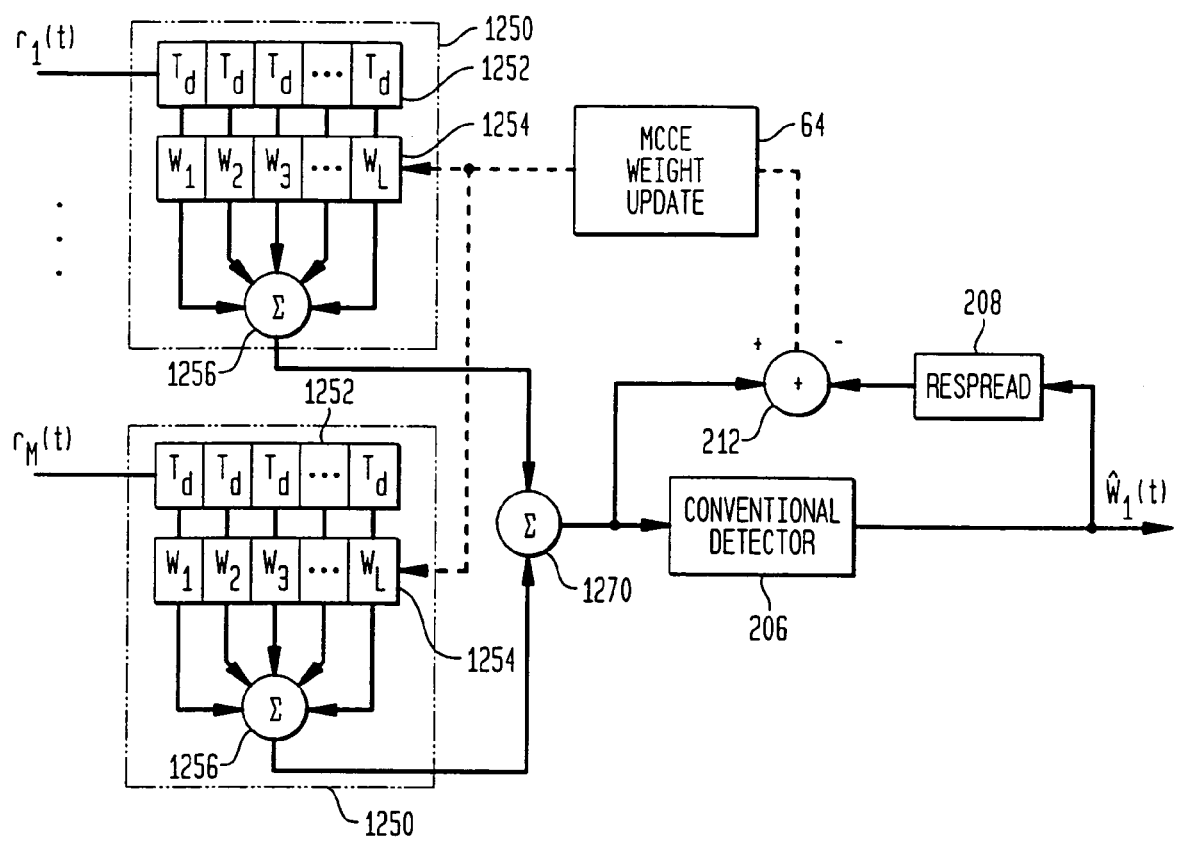
FIG. 12 is a network diagram of an illustrative embodiment of a STAP receiver in accordance with our invention.

A single user space time adaptive processing (STAP) receiver is depicted in FIG. 12 in accordance with an illustrative embodiment of our invention. The STAP receiver 1200 includes a plurality of filters 1250, one per antenna, in a parallel arrangement, a mathematical summation processor 1270 for combining the outputs of all the filters prior to detection, a conventional detector 206, a respread processor 208, mathematical operations processor 212, and an MCCE weight update processor 64. The receiver in FIG. 12 also can include implementations with a one time tap per antenna (spatial adaptive signal processing) or with a single antenna element and multiple time taps (single element adaptive rake receiver). Each filter 1250 contains a tap delay line 1252, a series of STAP weights 1254, and a summation processor 1256. In a traditional STAP receiver, the STAP weights in the filter 1250 can be trained using a known pilot signal. However, a key complication in applying STAP to the IS-95 reverse link is that there is no pilot present in the received signal. Our invention provides innovative processes for blind adaptation where no pilot signal exists to train the filter weight.

An illustrative embodiment of our invention comprises a space time adaptive processing (STAP) processor, means for hypothesizing possible symbols transmitted during a symbol period, a respread processor, means for weight computation wherein the hypothesized symbol and the vector input symbol are used to form a set of STAP weights which filter the input data spatially and temporally, a matched filter bank, means for determining a metric to measure the quality of the matched filter bank, and means for comparing generated metrics. The STAP processor includes a plurality of filters, each comprising a set of STAP weights, and a plurality of mathematical summation circuits. In addition, each filter may also include a tapped delay line. In a preferred IS-95 implementation, the matched filter bank is a bank of 64 matched filters that correspond to the 64 possible Walsh symbols.

When a user signal is received by the antenna array, the user signal from each antenna in the array is first downconverted to baseband in a processor (not shown) and sampled. Downconversion and sampling are performed by an external processor. After the resulting signal $r_1(t), r_2(t), \ldots r_M(t)$ is received, a metric is determined associated with a hypothesized symbol value. The metric used may also be referred to as the sharpness factor. The step of determining a metric is repeated for each of the possible 64 Walsh symbols. The resulting 64 metrics are compared in the comparison means to determine the best estimate for the transmitted signal. This estimate is the output of the blind adaptive STAP detector.

A more detailed description of the metric determination step is described below. After the input signal vector is received, the hypothesizing means hypothesizes which symbol was transmitted. The hypothesized symbol is communicated to the respread processor and spread to create a replica of the transmitted waveform. The replica of the transmitted waveform and the input signal vector are input to the weight computation means. The weight computation means uses these inputs to determine the appropriate STAP weights for the STAP filters. After the determination is made, these STAP weights are communicated to the filters and applied to each signal vector component, $r_1(t), r_2(t), \ldots r_M(t)$. Before application of the STAP weights, a tapped delay line may be applied to each component of the input signal vector. After application of the STAP weights, the weighted signals from every antenna are combined in a mathematical summation circuit. The output of the summation circuit is despread and input into the matched filter bank. The matched filter bank generates a metric associated with the hypothesized symbol.

In an alternate embodiment, the STAP processor may despread the delayed signals from each antenna element and then apply the STAP weights. After the STAP weights are applied, the results are summed and used as input to the matched filter bank.

For example in IS-95, the sharpness factor is computed by taking the ratio of the peak output (i.e., for the most likely transmitted symbol) to the sum of the outputs for all the other 63 hypothesized Walsh symbols. The sharpness factor can also be based on the distance between the peak output and the average of all other outputs. In either case the STAP solution with the largest sharpness factor is chosen to determine the correctly hypothesized symbol. This embodiment can be extended across multiple symbols where we hypothesize all combinations of multiple symbols.

In an alternative embodiment, the STAP filter weights are determined based on a combination of "known" symbols and hypothesized symbols. The known symbols may be obtained by feeding back previously detected symbols, or from a priori known pilot reference symbols. Utilizing the known symbols allows extension of the length of the training sequence without requiring additional hypothesized symbols. It also anchors the hypothesized STAP solutions to a partially known training sequence, which makes it more likely that the correctly hypothesized solution will stand out. The above embodiments can be repeated for each symbol. These procedures can also be utilized to detect initial symbol(s), and then utilize an update procedure to compute the STAP weights for the remaining symbols. In other words, the STAP weights of the previous symbol can be used to detect the current symbol which can then in turn be used to update the STAP tap weights for the next symbol.

III. Combined STAP and MUD

The STAP receiver shown in FIG. 12 is limited in several ways. First, it can only effectively null M−1 high level signals (including temporally resolvable multipath components) where M is the number of antennas used. Therefore, it is only effective at extracting the M strongest signal components. Another embodiment of our invention combines MUD and temporal interference cancellation techniques and thus, removes much of the interfering signals before applying the STAP receiver. This approach frees up STAP degrees of freedom to operate on the remaining interference more effectively.

Figure 13:
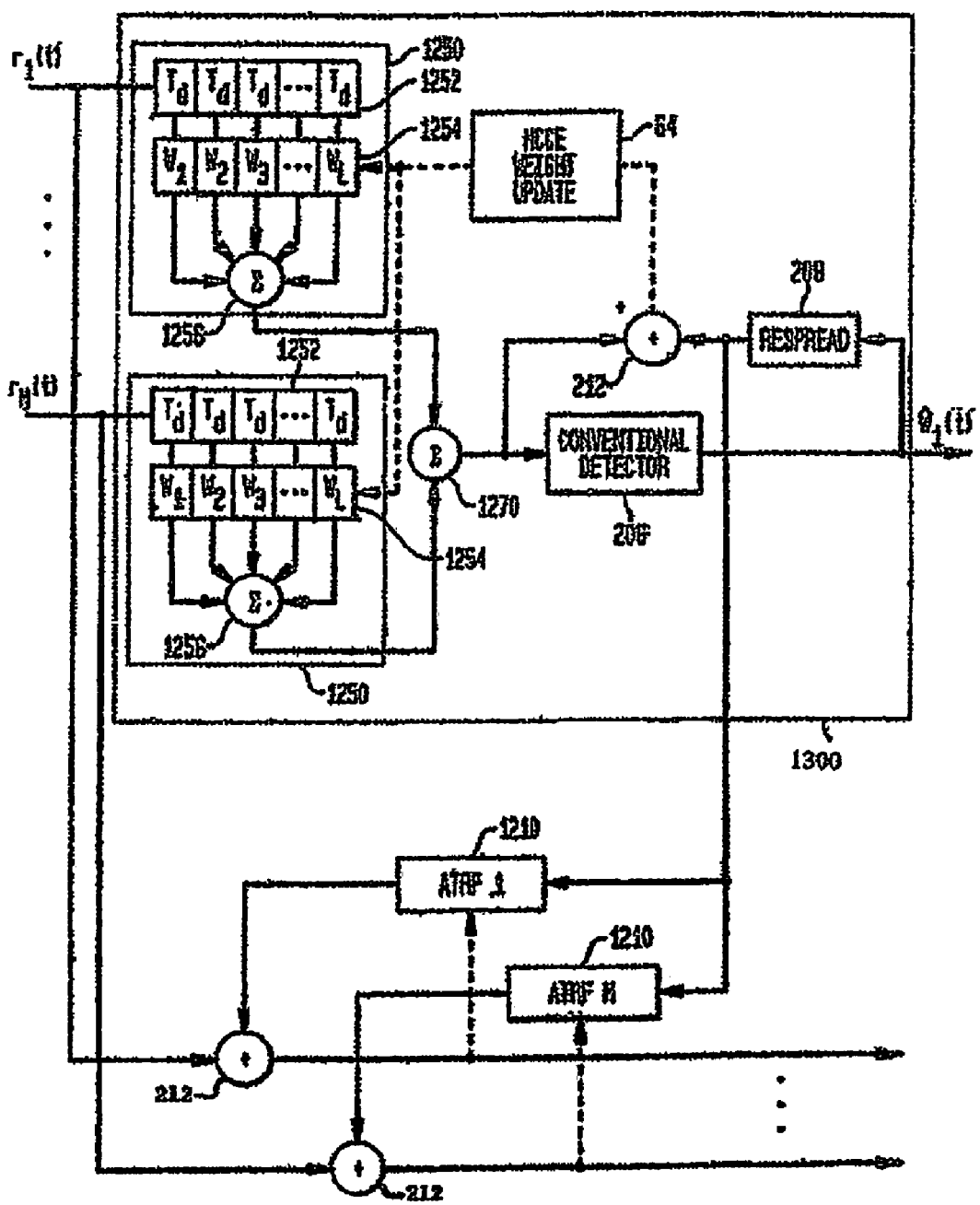
FIG. 13 is a network diagram of an illustrative embodiment of a stage in a STAP/VSIC-MCCE combination system in accordance with our invention.

FIG. 13 depicts a single stage of a system 1300 combining STAP, interference cancellation MUD, and minimum cost channel estimation (MCCE) according to a specific illustrative embodiment of our invention. The illustrative embodiment of our invention shown in FIG. 13 applies SIC (e.g., SIC-MCCE or SIC-JMCCE) to each antenna element separately. We shall refer to this system as the STAP/VSIC system where the V refers to the vector nature of the cancellation process. The multi-stage STAPNSIC receivers resemble the multi-stage SIC receivers of FIGS. 2, 4, and 5, except that the received signal and cleaned received signals are now vectors of size M.

A single stage of the STAP/VSIC system includes a STAP processor 1200, a plurality of ATRFs 1210, and a plurality of mathematical operations processors 212. The STAP receiver 1200 can be a standard STAP processor or a blind adaptive STAP processor. In an illustrative embodiment of our invention, the STAP processor 1200 includes a plurality of filters 1250, a mathematical operations processor 212, and a conventional detector 206. In an alternate embodiment, the STAP processor 1200 may include a respread processor 208 and may also include a MCCE weight update processor 64.

When a user signal is received by the antenna array, the user signal from each antenna in the array is first downconverted to baseband in a processor (not shown) and sampled. For each antenna, the resulting signal, $r_1(t), r_2(t), \ldots r_M(t)$, is communicated to the STAP processor 1200. After processing by the filters 1250, conventional detector 206, and the respread processor 208 as described in the embodiments above, the output of the respread processor 208, a vector estimate of the transmitted signal for the user, is communicated to the ATRFs 1210, one per antenna. Each ATRF 1210 then estimates the channel associated with the signal and reconstructs the signal interference. The methods used for channel estimation in the STAP/VSIC system can be either basic MCCE, JMCCE, or MF-MCCE techniques. Each reconstructed signal is then cancelled from the total received input for that antenna in a mathematical operations processor 212. The output of the plurality of mathematical operations processors 212, one per antenna, is then used as the vector input to the next STAP/VSIC stage.

The STAP/VSIC system approach can also be extended to vectorized parallel interference cancellation. We shall refer to this system as the STAP/VPIC system. In these embodiments, the system would take the form of the PIC detector shown in FIG. 9 with the conventional detector 206 replaced by the one of the above described embodiments of a STAP processor 1200.

Figure 14:
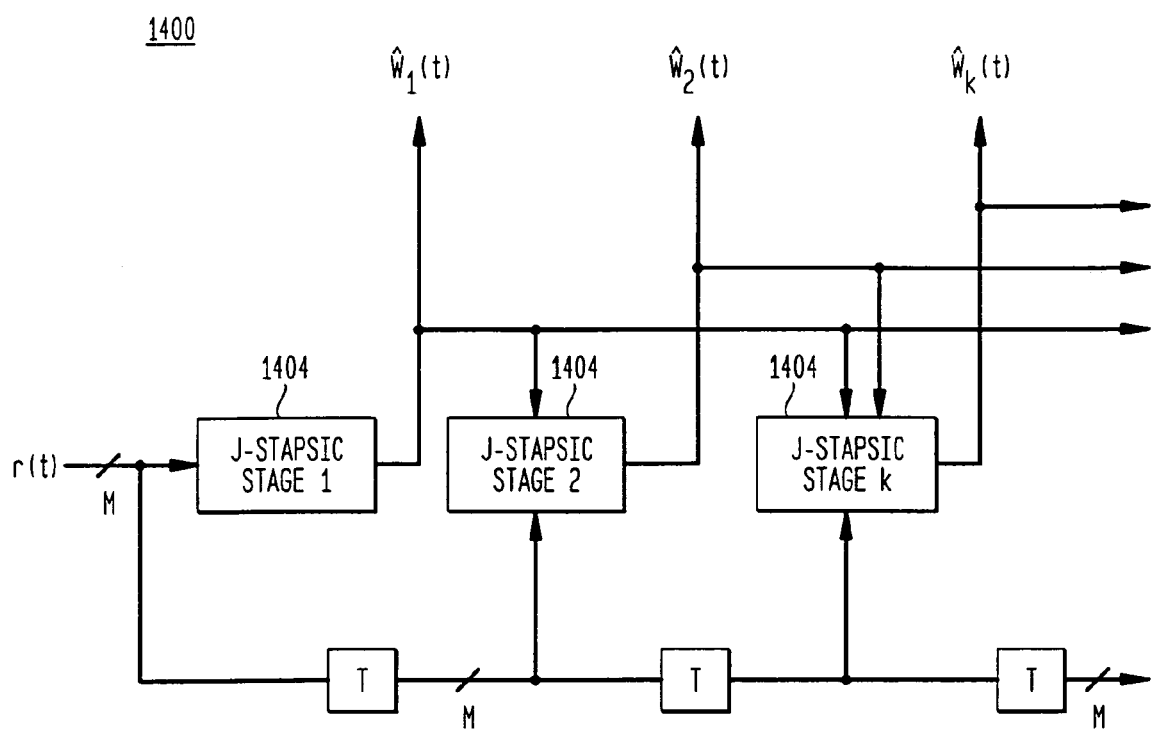
FIG. 14 is a network diagram of an illustrative embodiment of a J-STAPSIC combination system in accordance with our invention.

Another embodiment of our invention combines STAP with interference cancellation techniques. In this embodiment, the system jointly solves for the ATRF tap weights and STAP tap weights. For example, the system minimizes the error associated with the cost function between the transmitted symbol replica and the sum of the STAP filter outputs and ATRF filter outputs. FIG. 14 depicts one illustrative embodiment of our invention. We shall refer to this system as the J-STAPSIC system.

The illustrative system of FIG. 14 comprises a plurality of J-STAPSIC processors arranged in successive stages 1404. The input to the J-STAPSIC system 1400 is a vector of size M where M is equivalent to one received signal stream for each antenna element. Each stage utilizes the symbols of all previously detected users, and detects one additional user's symbols. The number of stages, K, is equivalent to the total number of users associated with the system.

Figure 15:
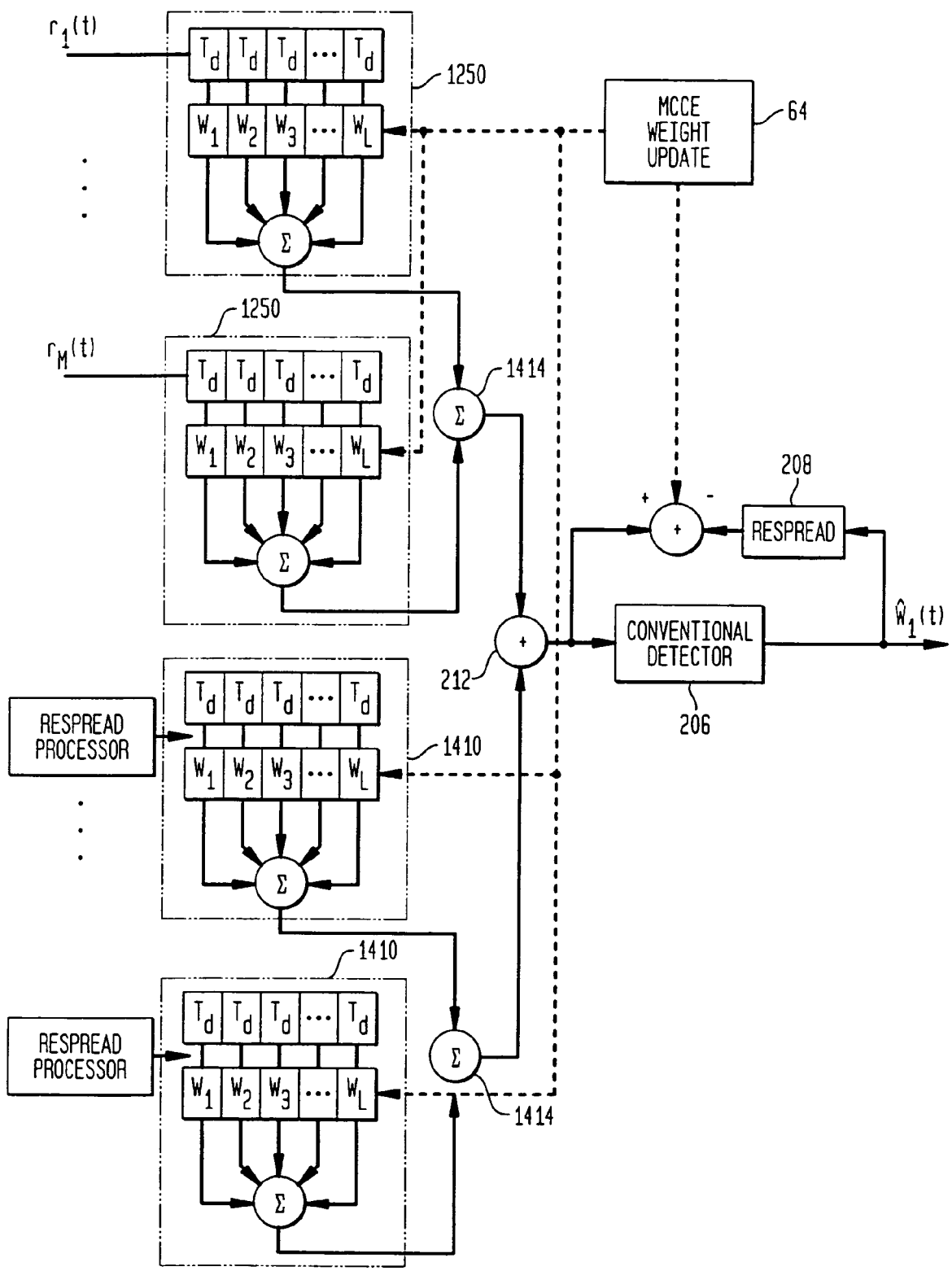
FIG. 15 depicts an illustrative J-STAPSIC stage for the combination of FIG. 14.

An illustrative embodiment of a $k^{th}$ J-STAPSIC stage 1404 is shown in FIG. 15. Each J-STAPSIC stage 1404 comprises a plurality of STAP filters 1250, one per antenna, in a parallel arrangement, a plurality of respread processors 208, one per previous stage, in a parallel arrangement for receiving the symbol estimates from the previous J-STAPSIC stages 1404, a plurality of ATRFs 1410, one per previous stage, a mathematical summation circuit 1414 for summing the outputs of the plurality of STAP filters 1250, a mathematical summation circuit 1414 for summing the outputs of the plurality of ATRFs 1410, a mathematical operations processor 212 for adding the outputs of the mathematical summation circuits 1414, a conventional detector 206, and a respread processor 208.

In the $k^{th}$ stage, the plurality of STAP filters 1250 receive a cleaned vector received signal, $r_1(t), r_2(t), \ldots r_M(t)$ from the previous stage and the plurality of parallel respread processors 208 receive a vector comprising symbol estimates determined in the previous stage. In each parallel respread processor 208, the symbol estimates are spread. The mathematical summation circuit 1414 sums the outputs from the plurality of the STAPs 1410 and another mathematical summation circuit 1414 sums the outputs from the plurality of ATRFs 1410. The outputs of these summation circuits 1414 are then combined in a mathematical operations circuit 212. Using the output of the mathematical operations circuit 212, the conventional detector 206 despreads the input and estimates the symbol transmitted. The symbol estimate is then spread by the respread processor 208. The output of the respread processor 208 is combined with the output of the conventional detector 206 and is used as input to an MCCE weight update processor 64. The MCCE weight update processor then updates in parallel the tap weights of the plurality of STAP filters and ATRFs 1250, 1410.

Although the invention has been shown and described with respect to exemplary embodiments thereof, it should be understood by those skilled in the art that various changes, omissions and additions may be therein and thereto, without departing from the spirit and the scope of the invention.

What is claimed is:

1. An apparatus enabling a wireless receiver for a code division multiple access system to receive input signals at varied power levels in the presence of interference wherein an input signal to the receiver is a vector comprised of one signal from each antenna in an antenna array of the receiver, the apparatus comprising:
   a space-time adaptive processing processor;
   means for hypothesizing a possible symbol transmitted during a symbol period;
   a respread processor for respreading the hypothesized symbol;
   means for weight computation wherein the respread hypothesized symbol and the input signal vector are used to form a set of space-time adaptive processing weights which filter the input signal vector spatially and temporally;
   a matched filter bank having a plurality of filters, each filter outputting a filtered signal; and
   means for calculating a metric based upon each filtered signal to measure a quality of the matched filter bank.

2. The apparatus of claim 1 wherein the space-time adaptive processing processor comprises a plurality of tapped delay lines, one per antenna element.

3. The apparatus of claim 1 wherein the possible symbols transmitted are 64 Walsh symbols for an IS-95 reverse link transmitter.

4. The apparatus of claim 3 wherein the matched filter bank is a bank of 64 matched filters corresponding to the 64 Walsh symbols.

5. The apparatus of claim 1 wherein the means for weight computation further comprises a means for using previously detected or known symbols.

6. A method enabling a receiver to receive input signals at varied power levels in the presence of interference wherein an input signal to the receiver is a vector comprised of one signal from each antenna in an antenna array of the receiver, the method comprising:

receiving the input signal vector;

determining a metric, wherein determining comprises:
hypothesizing which symbol was transmitted;
respreading the hypothesized symbol;
determining space-time adaptive processing weights based on the respread hypothesized symbol and the input signal vector;
applying a tap delay line to each signal vector component;
applying the space-time adaptive processing weights to each tap delayed signal vector component, one per antenna;
summing the weighted signal vector components in a mathematical summation circuit;
despreading an output of the summation circuit and inputting the despread signal to a matched filter bank, the matched filter bank having a plurality of filters, each filter outputting a filtered signal; and
generating a metric associated with the hypothesized symbol based upon each filtered signal;

repeating the metric determining for each of possible 64 Walsh symbols;

comparing each of the 64 metrics; and determining, based on the comparison, the transmitted symbol.

7. A method enabling a receiver to receive input signals at varied power levels in the presence of interference wherein an input signal to the receiver is a vector comprised of one signal from each antenna in an antenna array of the receiver, the method comprising:

receiving the input signal vector;

determining a metric, wherein determining comprises:
hypothesizing which symbol was transmitted;
respreading the hypothesized symbol;
determining space-time adaptive processing weights based on the respread hypothesized symbol and the input signal vector;
despreading delayed signal vector components, one per antenna;
applying the space-time adaptive processing weights to each of the despread delayed signal vector components;
summing the weighted signal vector components in a mathematical summation circuit;
inputting the summed weighted signal vector components into matched filter bank, the matched filter bank having a plurality of filters, each filter outputting a filtered signal; and
generating a metric associated with the hypothesized symbol based upon each filtered signal;

repeating the metric determining for each of possible 64 Walsh symbols;

comparing each of the 64 metrics; and determining, based on the comparison, the transmitted symbol.

8. An apparatus enabling a wireless receiver to receive input signals at varied power levels in the presence of interference, the apparatus comprising:

a plurality of filters configured to receive the input signals, wherein each filter comprises:
a tap delay line;
a plurality of space time adaptive processing weights; and
a first summation processor;

a second summation processor configured to combine outputs from the plurality of filters;

a detector configured to receive an output from the second summation processor;

a respread processor configured to receive an output from the detector;

a mathematical operations processor configured to receive outputs from the second summation processor and the respread processor; and a weight update processor configured to receive an output from the mathematical operations processor and update the plurality of space time adaptive processor weights in the plurality of filters, wherein the updating is done without the use of a pilot signal.

9. A method enabling a receiver to receive input signals at varied power levels in the presence of interference, the method comprising:

receiving an input signal vector at a plurality of filters, wherein the plurality of filters comprise a plurality of space time adaptive processing weights;

determining a metric for a plurality of symbols, wherein determining comprises:
filtering the input signal through the plurality of filters to create a filtered signal;
estimating a symbol in the filtered signal at a detector;
respreading the estimated symbol at a respread processor;
updating the space-time adaptive processing weights based on a processed signal comprising the respread estimated symbol and the filtered signal with a weight update processor;
filtering the processed signal through the plurality of filters to create a filtered processed signal; and
generating a metric in the filtered processed signal;

comparing metrics for the plurality of symbols; and determining, based on the comparison, the transmitted symbol.

10. The method of claim 9 wherein the plurality of filters further comprise a plurality of tapped delay lines.

11. The method of claim 9 wherein the plurality of symbols comprise 64 Walsh symbols for an IS-95 reverse link transmitter.

12. The method of claim 11 wherein the plurality of filters comprise 64 matched filters corresponding to the 64 Walsh symbols.

* * * * *

UNITED STATES PATENT AND TRADEMARK OFFICE
CERTIFICATE OF CORRECTION

PATENT NO. : 7,688,777 B2  Page 1 of 1
APPLICATION NO. : 10/971233
DATED : March 30, 2010
INVENTOR(S) : Joseph Charles Liberti, Jr. et al.

It is certified that error appears in the above-identified patent and that said Letters Patent is hereby corrected as shown below:

ON TITLE PAGE, Item (54)
Please delete the title "Combined Adaptive Spatio-Temporal Processing and Multi-User Detection for CDMA Wireless Systems" and insert --Apparatus and Methods for Enabling a Wireless Receiver to Receive Input Signals at Varied Power Levels in the Presence of Interference--.

Column 1, Line 1, delete the title "Combined Adaptive Spatio-Temporal Processing and Multi-User Detection for CDMA Wireless Systems" and insert --Apparatus and Methods for Enabling a Wireless Receiver to Receive Input Signals at Varied Power Levels in the Presence of Interference--.

Signed and Sealed this

Thirteenth Day of July, 2010

David J. Kappos
*Director of the United States Patent and Trademark Office*